Patented Apr. 12, 1927.

1,624,172

UNITED STATES PATENT OFFICE.

GASTON J. LEVY, OF LOS ANGELES, CALIFORNIA, ASSIGNOR TO HOLLYWOOD CHEMICAL COMPANY, OF LOS ANGELES, CALIFORNIA, A CORPORATION OF CALIFORNIA.

PROCESS OF RECOVERING METALS FROM SOLUTIONS.

No Drawing.    Application filed December 23, 1925. Serial No. 77,365.

My invention relates to a process of treating waste sodium thiosulphate solutions, such as occur in the motion picture industry as a result of the production of photographic films. As well known, such waste sodium thiosulphate solutions, or as they are known in the trade, hypo solutions, carry small quantities of silver, which in the aggregate amounts to a considerable sum annually.

It is an object of this invention to provide a simple, efficient and economical process of treating such waste hypo solutions to effect a complete recovery of the silver. For this purpose the waste hypo solution is treated with a metal hydrosulphite. The hypo solution may be either alkaline, acid or neutral. The metal hydrosulphite will cause a precipitation of the entire content of the silver in the hypo solution in the form of a dark black precipitate, which may be then smelted in any usual manner.

Prior processes use zinc dust in precipitation of silver from such solutions, but the recovery of silver usually amounts to about 95 per cent, while my process effects a complete recovery of all the silver present.

My invention consists in the steps of the process hereinafter described and claimed.

Waste hypo solutions containing in addition to well known ingredients, such as gelatin, sodium chloride, or bromide, thiosulphate of sodium and silver, which may be either in the form of $Ag_2Na_4(S_2O_3)_3$, which is soluble in water, or in the form of $NaAgS_2O_3$, which is slightly soluble in water, although normally the waste hypo solution will have the silver compound in its water soluble form.

To the hypo solution I add zinc hydrosulphite in proportions indicated by the molecular values in the following equations:

1. $ZnS_2O_4+4NaOH+Ag_2Na_4(S_2O_3)_3 = 2Ag+3Na_2S_2O_3+ZnSO_3+Na_2SO_3+2H_2O$

2. $ZnS_2O_4+2NaAgS_2O_3+4NaOH = Na_2SO_3+2Na_2S_2O_3+ZnSO_3+2H_2O+2Ag$

The silver is recovered in the form of a dark black precipitate consisting of granular crystals, which may be smelted down in any convenient manner.

In place of zinc hydrosulphite the corresponding hydrosulphite of iron, ammonium, potassium and sodium, and in fact, any other metals, which form hydrosulphites, may be used.

The reaction is very rapid, not requiring more than five minutes, and may be carried out under ordinary temperature.

Not only silver solutions, but solutions containing gold or platinum may also be treated in the same manner with the metal hydrosulphite for their recovery.

In place of adding the mixture of zinc hydrosulphite and sodium hydroxide, as described above, the zinc hydrosulphite may be formed in the waste hypo solution itself by the addition of sodium sulphite or any other soluble sulphite and zinc dust.

In place of zinc dust, iron or aluminum dust may be substituted, forming the corresponding metal hydrosulphite.

Any other soluble metal sulphite, including sulphur dioxide, which in water forms sulphurous acid or hydrogen sulphite, may be used to make zinc hydrosulphite.

While I have described my process in connection with the recovery of silver from waste hypo solutions, it is applicable to any solutions containing silver, gold, or platinum, as a soluble compound.

By the term "precious metals" I intend to include gold, silver and platinum.

Various changes may be made in the steps of the process by those skilled in the art, without departing from the spirit of my invention, as claimed.

I claim:

1. A process of treating waste hypo solutions containing silver, comprising adding a metal hydrosulphite to said solutions to precipitate the silver in the metallic form and separating the silver precipitate from said solution.

2. A process of treating waste hypo solutions containing silver, comprising adding zinc hydrosulphite to said solutions to precipitate the silver in the metallic form and separating the silver precipitate from the mixture.

3. A process of treating solutions containing a precious metal in a soluble compound, comprising adding a metal hydrosulphite to said solutions, whereby the precious metal is precipitated in metallic form and separating said precious metal from the mixture.

4. A process of treating solutions containing silver as a soluble compound, comprising adding a metal hydrosulphite to precipitate the silver therefrom and separating the silver from the mixture.

5. A process of treating solutions containing precious metal in a soluble compound, comprising adding a soluble sulphite thereto and metallic zinc dust, whereby the precious metal is precipitated in metallic form, and separating said precious metal from the mixture.

In testimony whereof I have signed my name to this specification.

GASTON J. LEVY.